United States Patent
Haase et al.

(10) Patent No.: US 10,276,880 B2
(45) Date of Patent: Apr. 30, 2019

(54) METHOD FOR PRODUCING A FUEL CELL AND A FUEL CELL SYSTEM

(71) Applicant: Bayerische Motoren Werke Aktiengesellschaft, Munich (DE)

(72) Inventors: Stefan Haase, Munich (DE); Johannes Schmid, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 242 days.

(21) Appl. No.: 15/007,484

(22) Filed: Jan. 27, 2016

(65) Prior Publication Data
US 2016/0164116 A1    Jun. 9, 2016

Related U.S. Application Data
(63) Continuation of application No. PCT/EP2014/064993, filed on Jul. 11, 2014.

(30) Foreign Application Priority Data
Aug. 7, 2013  (DE) ........................ 10 2013 215 605

(51) Int. Cl.
*H01M 8/0286* (2016.01)
*H01M 8/0271* (2016.01)

(52) U.S. Cl.
CPC ....... *H01M 8/0286* (2013.01); *H01M 8/0271* (2013.01)

(58) Field of Classification Search
CPC .................................................. H01M 8/0286
See application file for complete search history.

(56) References Cited

U.S. PATENT DOCUMENTS

| | | | | |
|---|---|---|---|---|
| 7,927,762 B2* | 4/2011 | Sano | ................... | H01M 4/8853 29/623.1 |
| 2003/0031914 A1 | 2/2003 | Frank et al. | | |

(Continued)

FOREIGN PATENT DOCUMENTS

| | | |
|---|---|---|
| DE | 602 15 198 T2 | 8/2007 |
| DE | 11 2005 000 861 B4 | 2/2010 |

(Continued)

OTHER PUBLICATIONS
Chinese-language Office Action issued in counterpart Chinese Application No. 201480044476.3 dated Nov. 6, 2017 with English translation (10 pages).

(Continued)

*Primary Examiner* — Osei K Amponsah
(74) *Attorney, Agent, or Firm* — Crowell & Moring LLP

(57) ABSTRACT

A method is provided for producing a fuel cell, which method includes the arrangement of in each case one gas diffusion layer with in each case one bipolar plate on a respective side of a membrane electrode arrangement which comprises an anode, a cathode and an electrolyte membrane arranged between the anode and the cathode. The gas diffusion layers are set back in relation to the bipolar plates and the membrane electrode arrangement. The gas diffusion layers have in each case at least one reaction fluid supply region and in each case at least one reaction fluid discharge region and in each case at least one reaction fluid sealing region. The method is characterized by injecting a sealing material into at least one reaction fluid sealing region of at least one gas diffusion layer such that the gas diffusion layer is sealed off to the outside.

17 Claims, 4 Drawing Sheets

(56) References Cited

U.S. PATENT DOCUMENTS

| | | | |
|---|---|---|---|
| 2005/0058878 A1* | 3/2005 | Martin | B29C 45/14065 |
| | | | 429/514 |
| 2005/0233202 A1 | 10/2005 | Fay et al. | |
| 2011/0203721 A1 | 8/2011 | Enayetullah et al. | |
| 2011/0229790 A1* | 9/2011 | Sato | H01M 8/0278 |
| | | | 429/469 |
| 2011/0305976 A1 | 12/2011 | Tanahashi et al. | |

FOREIGN PATENT DOCUMENTS

| | | |
|---|---|---|
| EP | 2 033 250 B1 | 1/2011 |
| WO | WO 2012/039699 A1 | 3/2012 |
| WO | WO 2012/102724 A1 | 8/2012 |

OTHER PUBLICATIONS

German-language Office Action issued in counterpart European Application No. 14 741548.3 dated Apr. 6, 2017 (Six (6) pages).

German-language Office Action issued in counterpart European Patent Application No. 14741548.3 dated Apr. 17, 2018 (Six (6) pages).

International Search Report (PCT/ISA/210) issued in PCT Application No. PCT/EP2014/064993 dated Oct. 3, 2015, with English translation (eleven (11) pages).

German Office Action issued in counterpart German Application No. 10 2013 215 605.7 dated Jan. 16, 2014, with partial English translation (ten (10) pages).

\* cited by examiner

METHOD FOR PRODUCING A FUEL CELL AND A FUEL CELL SYSTEM

CROSS REFERENCE TO RELATED APPLICATIONS

This application is a continuation of PCT International Application No. PCT/EP2014/064993, filed Jul. 11, 2014, which claims priority under 35 U.S.C. § 119 from German Patent Application No. 10 2013 215 605.7, filed Aug. 7, 2013, the entire disclosures of which are herein expressly incorporated by reference.

BACKGROUND AND SUMMARY OF THE INVENTION

The present invention relates to methods for producing a fuel cell, and also a fuel cell system, in which a gas diffusion layer present in the fuel cell or in the fuel cell system and/or cooling ducts that may be provided, are sealed off. Furthermore, the present invention relates to the use of a barrier layer applied on a gas diffusion layer of the fuel cell.

In a fuel cell system, individual fuel cells are connected in series to form a fuel cell stack in order to achieve a higher voltage. An end plate is located at each end of a fuel cell stack. A current collector (usually made of copper) is located between the end plate and the fuel cell stack, collects the electric current from all the fuel cells and conducts it away from the fuel cell stack. The fuel cells each comprise a membrane electrode arrangement, which is introduced between a cathode-side and an anode-side gas diffusion layer, a bipolar plate being arranged in each case on that side of the gas diffusion layers which is remote from the membrane electrode arrangement. The gas diffusion layers are set back in relation to the bipolar plates and the membrane electrode arrangements. The gas diffusion layers comprise reaction fluid supply regions for transporting the reaction gases and/or liquids to the electrodes and reaction fluid discharge regions for transporting reaction gases and/or liquids away from the electrodes. Cooling ducts for transporting coolants are also often provided in the region of the bipolar plates of the fuel cells. To seal off the respective gas-carrying or fluid-carrying layers or ducts of the fuel cells, it is necessary for seals to be provided, these being pressed on, adhesively bonded or inserted. By way of example, seals are applied for this purpose to both sides of the bipolar plates or the membrane electrode arrangement in order to seal off the gas diffusion layer lying therebetween or cooling ducts which are possibly also provided, i.e. to prevent the escape of gas or other reaction fluids or further liquids, for example the cooling liquids. The seals have a predefined height or thickness and are applied individually to each bipolar plate or membrane electrode arrangement. This has the disadvantage that a leak-tightness of the system can only be ensured with difficulty particularly given large tolerances of the components of the fuel cell or given small seal thicknesses, the individual application of the seals being very complicated and increasing the costs of the production process. In order to prevent leakages, use is therefore made of higher seal lines, which are intended to afford maximum coverage of the tolerances of all components, as a result of which the use of material increases and the throughflow region of the gases and liquids—in general terms the fluids—is reduced. The latter leads to an increase in the pressure loss of the medium, and this leads to major losses in the BoP (Balance of Plant) components and reduces the efficiency of the system. Documents US 2011/229790 A1 and WO 2012/102724 A1 disclose technologies which are already known.

Proceeding from this prior art, it is therefore an object of the present invention to provide methods for producing a fuel cell or a fuel cell system which easily and cost-effectively achieve an effective, i.e. gas-tight or liquid-tight (summarized hereinbelow as "fluid-tight"), sealing off of a gas diffusion layer and/or a provided cooling duct.

In the case of a first method for producing a fuel cell, the method having a step of arranging in each case a gas diffusion layer with in each case a bipolar plate on a respective side of a membrane electrode arrangement which comprises an anode, a cathode and an electrolyte membrane arranged between the anode and the cathode, the gas diffusion layers being set back in relation to the bipolar plates and the membrane electrode arrangement, and the gas diffusion layers having in each case at least one reaction fluid supply region and in each case at least one reaction fluid discharge region and also in each case at least one reaction fluid sealing region, this object is achieved, according to an embodiment of the invention, by the further step of injecting a sealing material into at least one reaction fluid sealing region of at least one gas diffusion layer in such a manner that the gas diffusion layer is sealed off to the outside. By virtue of the injection, the injected sealing material comes to lie in such a way as to achieve a high leak-tightness of the gas diffusion layer with respect to fluids, the reaction fluid supply region and the reaction fluid discharge region not being sealed off.

Furthermore, the object is also achieved by a second method for producing a fuel cell, the method having the step of arranging in each case a gas diffusion layer with in each case a bipolar plate on a respective side of a membrane electrode arrangement which comprises an anode, a cathode and an electrolyte membrane arranged between the anode and the cathode, the gas diffusion layers being set back in relation to the bipolar plates and the membrane electrode arrangement, and the gas diffusion layers having in each case at least one reaction fluid supply region and in each case at least one reaction fluid discharge region, and at least one bipolar plate having at least one cooling duct with at least one coolant supply region, at least one coolant discharge region and at least one cooling duct sealing region, according to an embodiment of the invention by the step of injecting a sealing material into at least one cooling duct sealing region of at least one bipolar plate in such a manner that the cooling duct is sealed off to the outside.

For the purposes of the invention, a gas diffusion layer encompasses conventional gas diffusion layers, but also microporous layers or foam-like materials. The reaction fluid supply regions and reaction fluid discharge regions can be fed from outside the fuel cell (external manifold) or can be integrated in regions of the fuel cell, in particular of the bipolar plates (internal manifold). The injection of the sealing material is a time-efficient method by virtue of which seal lines can be applied precisely and quickly with a specific height matched to the region to be covered, while simultaneously taking into consideration and locally compensating for material and production tolerances of the fuel cell components. The step of the injection of sealing material can similarly be employed for all gas diffusion layers or cooling ducts of the fuel cell. A fuel cell having a very high fluid leak-tightness is thereby provided in a simple and cost-effective manner which saves material.

According to one advantageous development of the first method according to the invention, at least one cooling duct with at least one coolant supply region and at least one coolant discharge region is provided on at least one bipolar plate. The cooling duct can flank the bipolar plate and/or be integrated in the bipolar plate. The cooling duct serves for guiding coolant and therefore for transporting heat away from the fuel cell.

A further advantageous development of the first method according to the invention provides that at least one cooling duct sealing region is provided on the bipolar plate having a cooling duct with at least one coolant supply region and at least one coolant discharge region, and sealing material is injected into at least one cooling duct sealing region of the bipolar plate in such a manner that the cooling duct is sealed off to the outside. Not only the gas diffusion layers, but also the cooling ducts are thereby sealed off in a fluid-tight manner, and this effectively prevents an undesirable escape of coolant and makes the operation of the fuel cell more reliable.

One advantageous development provides that the injection of the sealing material onto a reaction fluid sealing region of at least one gas diffusion layer and/or onto at least one cooling duct sealing region of the bipolar plate also comprises injection onto a side face of the gas diffusion layer and/or a side face of the cooling duct. As a result of this, the gas diffusion layer and/or the cooling duct is sealed off particularly effectively.

It is further advantageously provided that the injection is carried out by use of one or more nozzles arranged laterally on the fuel cell and/or introduced at least partially into the reaction fluid sealing region and/or cooling duct sealing region. Through the use of laterally arranged nozzles, it is possible to produce sealing lines with a high precision, thickness and height. If the nozzles are introduced at least partially into the reaction fluid sealing region and/or cooling duct sealing region, it is possible for the sealing lines to be injected more effectively and more easily, for example, directly onto a side face of the gas diffusion layer, such that sealing material comes to lie to a lesser extent on the easily accessible edge of the bipolar plate, but rather directly on the fluid-carrying layer to be sealed off.

To seal off the gas-carrying layer with greater uniformity and to a more complete extent, the nozzle can be moved during the injection of the sealing material. It is particularly advantageous here for the nozzle to be pivoted or tilted, with the injection angle of the sealing material being changed. As a result, the corner regions which are more difficult to access can also be covered completely and uniformly with sealing material. In addition, a suitable selection of the injection angle makes it possible for more material to be injected into the vicinity of the bipolar plate, this preventing the membrane from being pushed away and/or sealing material from flowing over into a neighboring duct.

It is further advantageous that a movement of the fuel cell during the injection of the sealing material also contributes to a better and more uniform distribution of the sealing material. As with respect to the movement of the nozzle, the movement of the fuel cell also includes pivoting or tilting of the fuel cell, with the injection angle of the sealing material being changed, this simplifying the distribution of the sealing material even into the corner regions which are difficult to access.

According to one advantageous development, the method according to the invention includes the further step of drying (solidifying or hardening) the sealing material, the fuel cell being compressed during the drying of the sealing material. The compression pressure or contact pressure compacts the individual layers of the fuel cell. There is therefore a tolerance compensation as a result of the fact that the sealing material is distributed laterally by the acting pressure, where required. As a result, the seal lines can thereby be adapted to the real operating conditions and excessive metering of sealing material in terms of height can be avoided. In this respect, the compression pressure can advantageously correspond to a pressure which prevails in the fuel cell stack, but can also be lower or higher.

It is further advantageous that the bipolar plate has at least one embossed section, and the sealing material is injected only in the region of the embossed section. The embossed section serves as a discharge barrier for the sealing material and limits the injection region to intended locations. In addition, it is therefore also possible to produce a form-fitting connection between the sealing material and the bipolar plate, this counteracting slipping out of the seal under mechanical loading.

To reduce the production time of the fuel cell, the injection can be effected under high pressures, as are employed for example in plastic injection molding. Deformation, compression or penetration of sealing material into the gas diffusion layer should be avoided in this case, however, so as not to reduce the functionality of the gas diffusion layer. A further advantageous embodiment therefore provides that a barrier layer is applied to at least part of a side face of at least one reaction fluid sealing region of at least one gas diffusion layer and/or to at least part of a side face of a coolant sealing region of a cooling duct, said barrier layer preventing penetration of the sealing material into the gas diffusion layer or the cooling duct during injection. This part can include in particular the entire reaction fluid sealing region of the gas diffusion layer or the entire coolant sealing region of the cooling duct.

It is particularly advantageous that the barrier layer is removed again after the injection of the sealing material so as not to jeopardize the functionality of the gas-carrying layer. This can be effected by a physical and/or chemical process and is preferably carried out by the conditions which prevail during operation of the fuel cell. For this purpose, the barrier layer is preferably formed from a material which is water-soluble, thermally unstable, readily gasifiable, unstable to acid and/or sensitive to pressure.

It is further advantageous that the method according to the invention is characterized in that a spacer is fitted between a bipolar plate and a membrane electrode arrangement during the injection of the sealing material. Alternatively, a plurality of spacers can also be used for the same purpose. The spacer or the spacers serve for supporting the layers between which the sealing material is injected and/or can prevent the sealing material from flowing into a neighboring duct. The spacer or the spacers are removed again in a suitable manner after the sealing process has been completed.

As an alternative or in addition to the use of spacers, the bipolar plate and the membrane electrode arrangement can also be supported by virtue of the fact that the reaction gas sealing region of the gas diffusion layer is supported in that a side face of the gas diffusion layer protrudes to the same extent as the membrane electrode arrangement.

The invention likewise also describes the use of a barrier layer which is applied on a gas diffusion layer and is made of a removable material for preventing the penetration of a sealing material into the gas diffusion layer during the injection of the sealing material onto a reaction fluid sealing region of the gas diffusion layer in such a manner that the gas diffusion layer is sealed off to the outside. This provides a fluid-tight (i.e. gas-tight and/or liquid-tight) system which is protected specifically in the sensitive region of the gas diffusion layer during the injection of the sealing material and thus prevents penetration of sealing material into the gas diffusion layer or deformation thereof.

The invention furthermore relates to a method for producing a fuel cell system having a plurality of fuel cells combined to form a fuel cell stack. The method is characterized by the step of stacking at least two fuel cells, at least one fuel cell being produced by a method as described above. The method according to the invention for producing a fuel cell system produces a fuel cell system, in a simple and material-saving manner with reduced costs, which is distinguished by a very good leak-tightness with respect to reaction fluids and/or cooling ducts on account of the injection of sealing material taking into consideration local material and production tolerances of the individual components of the fuel cell system.

The developments, advantages and effects described for the methods according to the invention for producing a fuel cell are also applicable to the method according to the invention for producing a fuel cell system.

To increase the efficiency of the method, the sealing material can be injected simultaneously by a plurality of nozzles. As already described above, the nozzles can be formed such that they can be moved, tilted, pivoted or rotated, and therefore it is possible to change the injection angle. As a result of the parallel injection via a system with a plurality of nozzles, it is possible for the fuel cell system to be produced in a particularly cost-efficient manner over a short time.

The following advantages arise on account of the solution according to the invention and the developments thereof:
  The methods according to the invention can be carried out easily and cost-effectively through the use of standard processes.
  The methods according to the invention make it possible to precisely apply sealing material to the fluid-carrying layers of a fuel cell or of a fuel cell system taking into consideration and locally compensating for material and production tolerances of the individual components of the fuel cell or of the fuel cell system.
  By virtue of the pre-compression during the drying of the sealing material, the seal height can be adapted to the seal height set during operation of the fuel cell system and therefore sealing material can also be saved.
  The production of thin, homogeneous seal lines is simplified.
  The methods are not time-consuming and are therefore suitable for mass production.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show only the aspects of the method according to the invention for producing a fuel cell system which are of interest here; all other aspects are omitted for the sake of clarity. Furthermore, identical reference signs relate to identical components of the fuel cell system.

Figure 1:
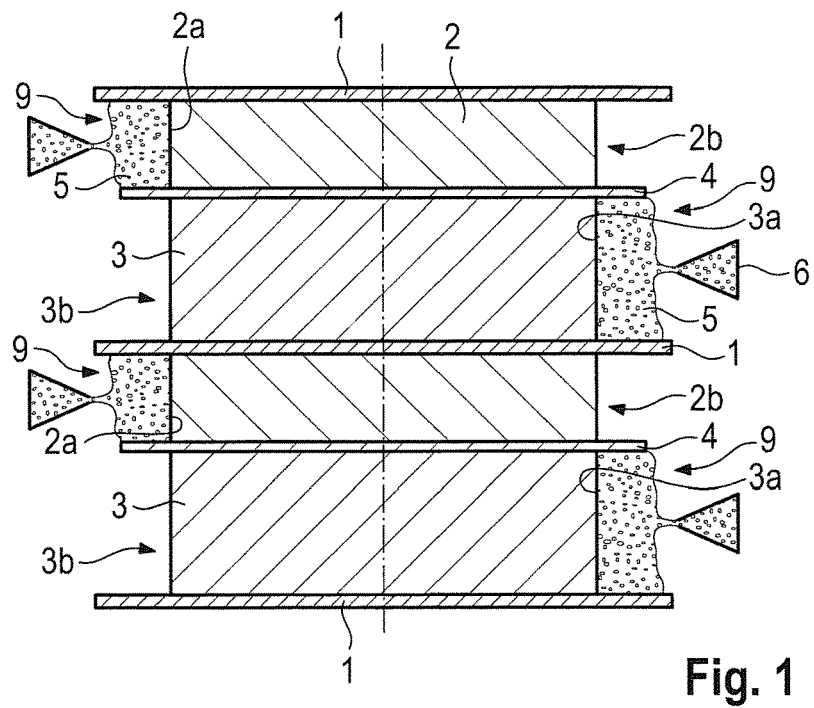
FIG. 1 is a schematic illustration of a first method for producing a fuel cell system according to a first embodiment of the invention.

FIG. 1 shows a schematic illustration of the method for producing a fuel cell system according to a first embodiment of the invention. What is shown in detail is an excerpt of a fuel cell system in section. The fuel cell system includes bipolar plates 1 and membrane electrode arrangements 4 and gas diffusion layers 2, 3 lying respectively therebetween. The gas diffusion layer 2 is the anode-side gas diffusion layer and the gas diffusion layer 3 is the cathode-side gas diffusion layer. The gas diffusion layers 2, 3 are formed in such a way that they stand back or are set back in relation to the bipolar plates 1 and the membrane electrode arrangements 4. In other words, the bipolar plates 1 and the membrane electrode arrangements 4 protrude beyond the gas diffusion layers 2, 3, such that clearances are formed between the bipolar plates 1 and the membrane electrode arrangements 4.

Each gas diffusion layer 2, 3 has at least one reaction fluid supply region and at least one reaction fluid discharge region for supplying and discharging reaction fluids, which pass through the respective gas diffusion layer 2, 3 in any desired form and distribution. For the sake of a better illustration, FIG. 1 shows regions 2b and 3b, the region 2b here constituting, by way of example, the anode-side reaction fluid supply region and the region 3b constituting, by way of example, the cathode-side reaction fluid supply region. The regions 9 represent anode-side and cathode-side reaction fluid sealing regions, that is to say regions which serve neither for supplying reaction fluid nor for discharging reaction fluid. The escape of reaction fluid into these regions of the fuel cell system should be prevented in order to ensure a reliable and efficient operation of the fuel cell system without the functions of the reaction fluid supply regions 2b, 3b and reaction fluid discharge regions being hindered.

If the fuel cell system is formed, for example, as a cube formed from individual layers, four lateral sides are exposed on each gas diffusion layer 2, 3. A top side in this respect is covered by a bipolar plate 1 and a bottom side is covered by a membrane electrode arrangement 4. Of the four free lateral sides, one serves, for example, for supplying reaction fluid and another serves for transporting reaction fluid away. These two sides are consequently reaction fluid supply regions and reaction fluid discharge regions. The two remaining sides would therefore be reaction fluid sealing regions to be sealed off.

In FIG. 1, nozzles 6 are fitted laterally in relation to the fuel cell system. These nozzles are used to inject sealing material 5 into the reaction fluid sealing regions 9 and possibly also onto a side face of the respective gas diffusion layer 2a, 3a. In the process, the sealing material 5 fills the reaction fluid sealing regions 9 at least partially, but in any case to such an extent that the gas diffusion layers 2, 3 are sealed off to the outside.

Figure 2:
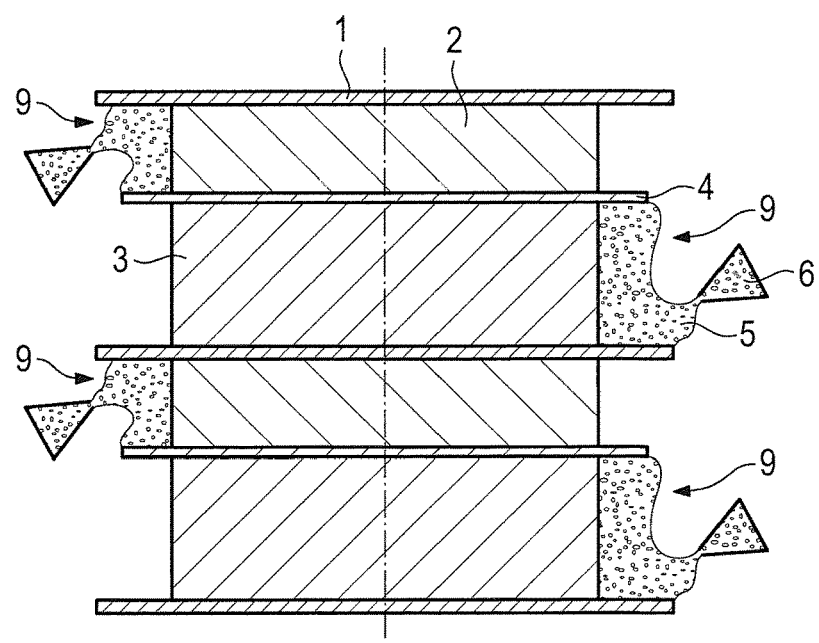
FIG. 2 is a schematic illustration of the first method for producing a fuel cell system according to a second embodiment of the invention.

FIG. 2 shows a schematic illustration of the method for producing a fuel cell system according to a second embodiment of the invention. In contrast to the diagram shown in FIG. 1, the nozzles 6 shown here are pivotable, such that the injection angle of the sealing material 5 is variable. It is therefore possible for sufficient sealing material 5 to be introduced particularly into the corner regions of the reaction fluid sealing regions 9 which are more difficult to reach, that is to say into the corner regions formed by the gas diffusion layers 2, 3 and the bipolar plates 1, as a result of which leakages in this region are effectively avoided.

It is preferable that the nozzles 6 are not only pivotable but also rotatable and movable in a horizontal direction, such that the sealing material 5 completely covers parts of the reaction fluid sealing regions 9 and possibly also the side faces of the gas diffusion layer 2a, 3a even in the case of a thin seal line.

Figure 3:
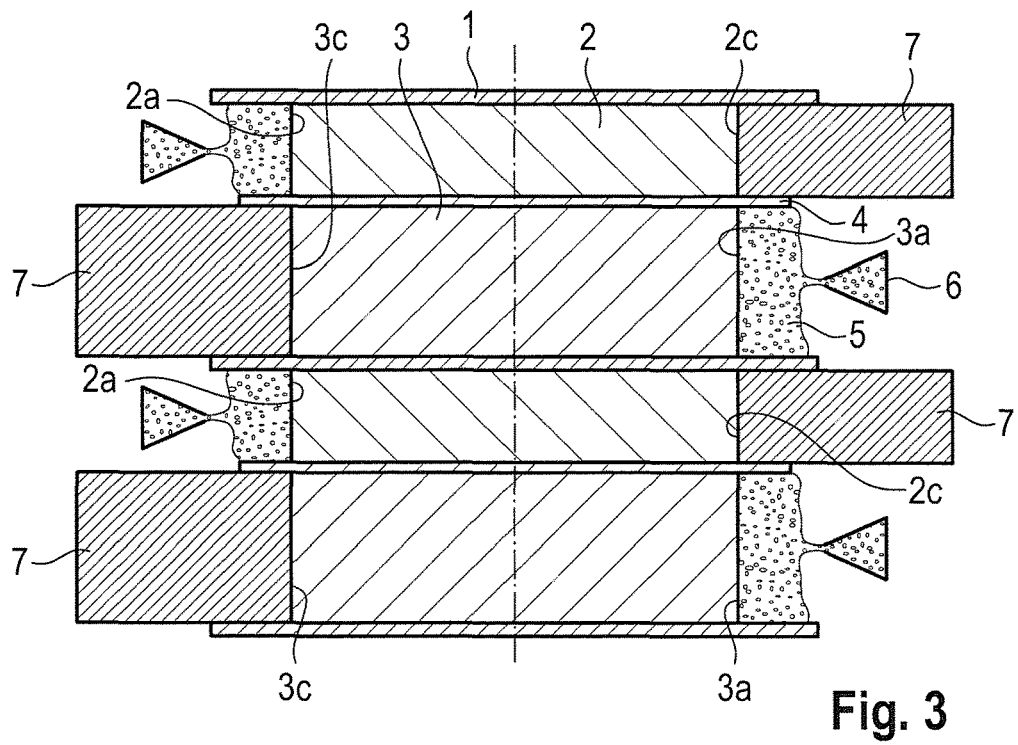
FIG. 3 is a schematic illustration of the first method for producing a fuel cell system according to a third embodiment of the invention.

According to the third embodiment of the method according to the invention as shown in FIG. 3, spacers 7 are fitted between the bipolar plate 1 and the membrane electrode arrangements 4 on those sides 2c, 3c which lie opposite the side faces of the gas diffusion layers 2a, 3a onto which sealing material 5 is injected, these spacers primarily supporting the bipolar plates 1 against the membrane electrode arrangements 4 and furthermore preventing penetration of sealing material 5 into unintended regions.

The spacers 7 can be arranged movably in their function of preserving a spacing between the bipolar plates 1 and the membrane electrode arrangements 4, i.e. they can circulate about the side faces of the gas diffusion layers 2, 3. As a result, the spacers can support correspondingly surrounding regions during the injection process into the reaction fluid sealing regions 9.

The spacers 7 are preferably removed again after the injection of sealing material, i.e. after the gas diffusion layers 2, 3 have been sealed off.

Figure 4:
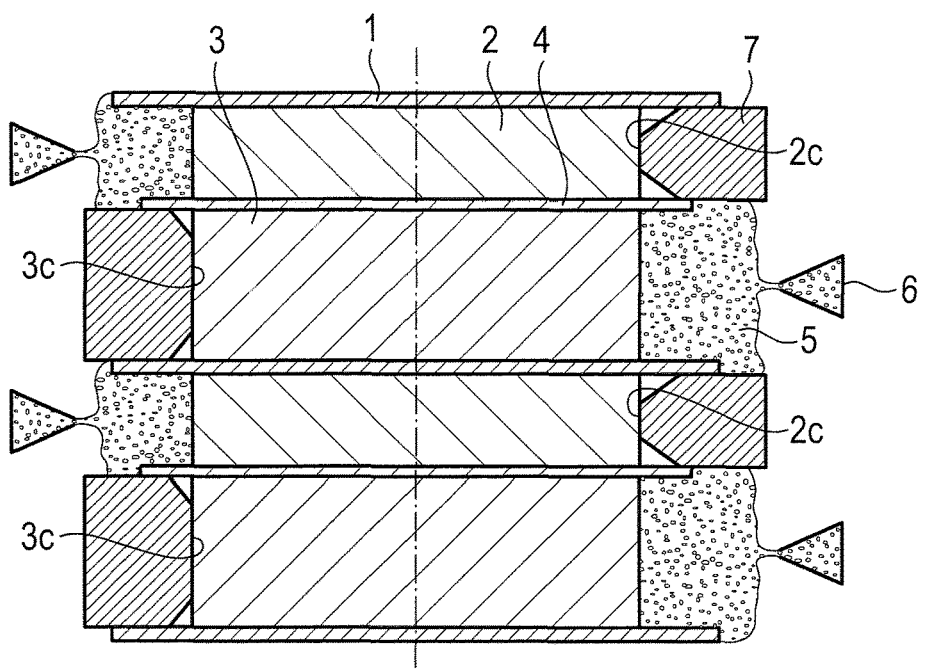
FIG. 4 is a schematic illustration of the first method for producing a fuel cell system according to a fourth embodiment of the invention.

FIG. 4 shows an alternative form of the spacers 7. The spacers 7 again perform the function of preventing penetration of sealing material 5 into unintended regions and also of supporting the bipolar plates 1 against the membrane electrode arrangements 4.

Figure 5:
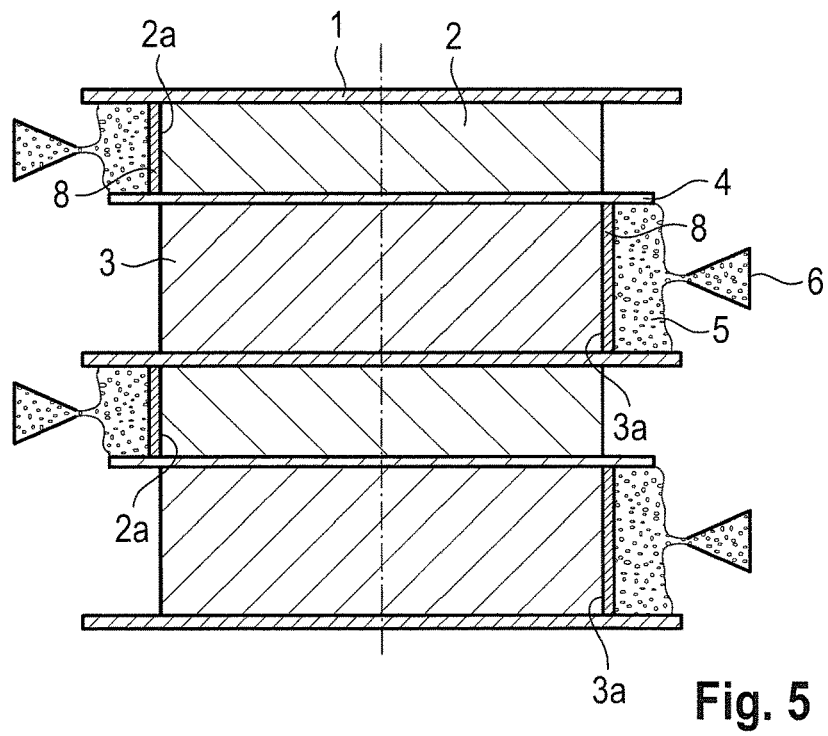
FIG. 5 is a schematic illustration of the first method for producing a fuel cell system according to a fifth embodiment of the invention.

As shown in FIG. 5, in this embodiment barrier layers 8 have been applied to the side faces of the gas diffusion layers 2a, 3a before the injection of the sealing material 5, these barrier layers preventing penetration and deformation of the gas diffusion layers 2, 3 by the sealing material 5 during the injection thereof.

The material of the barrier layers 8 can be removed again after the fuel cell system has been sealed off or can remain at the intended location, and for this purpose is preferably made of a material which can be removed by a physical and/or chemical process, for example a material which is water-soluble, thermally unstable, readily gasifiable and/or unstable to acid and/or sensitive to pressure. It is particularly advantageous that the barrier layer 8 is removed by the conditions which prevail during operation of the fuel cell.

Figure 6:
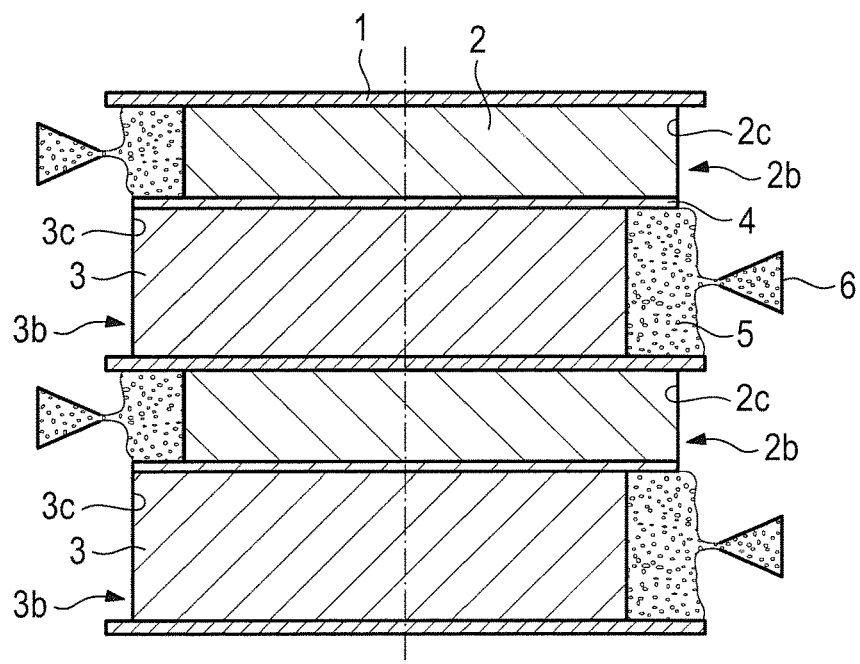
FIG. 6 is a schematic illustration of the first method for producing a fuel cell system according to a sixth embodiment of the invention.

FIG. 6 shows a development which can be used as an alternative or in addition to FIG. 3. Here, the gas diffusion layers 2, 3, more precisely the side faces 2c of the anode-side reaction fluid supply regions 2b and the side faces 3c of the cathode-side reaction fluid supply regions 3b, protrude to the same extent as the membrane electrode arrangements 4. This contributes to supporting the bipolar plates 1 against the membrane electrode arrangements 4.

Figure 7:
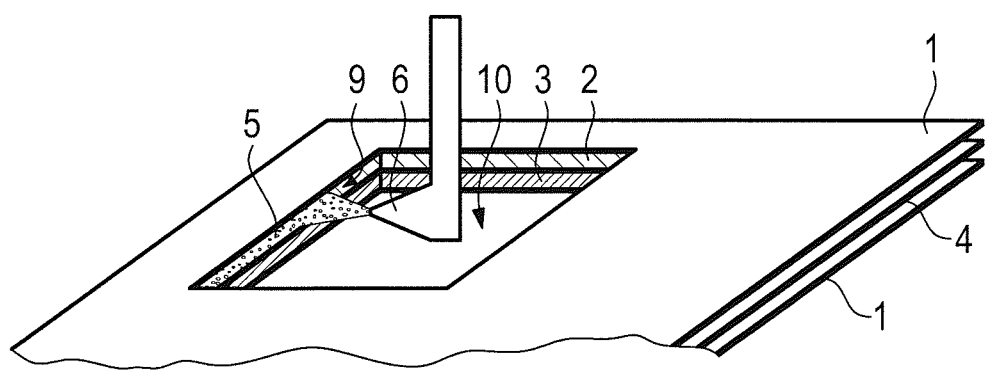
FIG. 7 is a schematic illustration of a further method for producing an alternative fuel cell system.

FIG. 7 is a schematic illustration of a further method for producing an alternative fuel cell system having integrated connections for a reaction fluid. In detail, the excerpt of the fuel cell system shows a layer structure analogous to the preceding fuel cell systems, this layer structure having a membrane electrode arrangement 4, an anode-side gas diffusion layer 2, a cathode-side gas diffusion layer 3 and two flanking bipolar plates 1. The gas diffusion layers 2, 3 are set back in relation to the bipolar plates 1 and the membrane electrode arrangement 4. The gas diffusion layers have reaction fluid supply regions (not shown), reaction fluid discharge regions (not shown) and reaction fluid sealing regions 9. FIG. 7 shows by way of example an anode-side reaction fluid sealing region. The reaction fluid is supplied to the fuel cell system via a reaction fluid duct 10. So that reaction fluid does not escape from the reaction fluid duct 10 and is not conducted into unintended layers of the layer structure of the fuel cell system, a nozzle 6 again injects sealing material 5 into a reaction fluid sealing region 9, as a result of which the fuel cell system is sealed off in this region.

The embodiments of the invention illustrated by the figures describe two-fluid fuel cell systems. The present invention can also be applied analogously, however, to multi-fluid fuel cell systems, for example to three-fluid fuel cell systems.

Furthermore, it is not necessary for the sealing material to be sprayed through the reaction fluid sealing regions 9 directly onto a side face 2a, 3a of the gas diffusion layers 2, 3. Instead, the sealing material 5 can also be injected in an edge region, i.e. for example at the inlet of the reaction fluid sealing regions 9.

LIST OF REFERENCE SIGNS

1 Bipolar plate
2 Gas diffusion layer on the anode side
2a Side face of the anode-side gas diffusion layer
2b Reaction fluid supply region on the anode side
2c Side face of the anode-side reaction fluid supply region
3 Gas diffusion layer on the cathode side
3a Side face of the cathode-side gas diffusion layer
3b Reaction fluid supply region on the cathode side
3c Side face of the cathode-side reaction fluid supply region
4 Membrane electrode arrangement
5 Sealing material
6 Nozzle
7 Spacer
8 Barrier layer
9 Reaction fluid sealing region
10 Reaction fluid duct The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fuel cell, the method comprising the acts of:
arranging, in each case, a gas diffusion layer with, in each case, a bipolar plate on a respective side of a membrane electrode arrangement, which arrangement comprises an anode, a cathode and an electrolyte membrane arranged between the anode and the cathode, wherein the gas diffusion layers are set back in relation to the bipolar plates and the membrane electrode arrangement, and further wherein the gas diffusion layers have, in each case, at least one reaction fluid supply region, at least one reaction fluid discharge region, and at least one reaction fluid sealing region; and injecting a sealing material into the at least one reaction fluid sealing region of at least one gas diffusion layer such that the at least one gas diffusion layer is sealed-off externally, wherein the at least one reaction fluid supply region and the at least one reaction fluid discharge region are fed from outside the fuel cell, wherein each gas diffusion layer has four lateral sides, two sides of the each gas diffusion layer are a reaction fluid supply region and a reaction fluid discharge region, and the other two sides of the each gas diffusion layer are reaction fluid sealing regions to be sealed off.

2. The method according to claim 1, further comprising the act of:

providing at least one cooling duct having at least one coolant supply region and at least one coolant discharge region, the at least one cooling duct being provided on at least one bipolar plate, wherein at least one cooling duct sealing region is provided on the bipolar plate having the cooling duct with the at least one coolant supply region and the at least one coolant discharge region, and further wherein the sealing material is injected into the at least one cooling duct sealing region of the bipolar plate such that the cooling duct is sealed-off externally.

3. The method according to claim 2, wherein the injection of the sealing material into the reaction fluid sealing region of the at least one gas diffusion layer and/or into the at least one cooling duct sealing region of the bipolar plate also comprises injecting the sealing material onto a side face of the gas diffusion layer and/or a side face of the cooling duct.

4. The method according to claim 2, wherein the injection is carried out via one or more nozzles arranged laterally on the fuel cell and/or introduced at least partially into the reaction fluid sealing region and/or cooling duct sealing region.

5. The method according to claim 4, wherein, during the injection of the sealing material, the one or more nozzles are moved or pivoted so as to change an injection angle.

6. The method according to claim 1, wherein the fuel cell is moved during the injecting of the sealing material.

7. The method according to claim 1, further comprising the act of:

drying the sealing material, wherein the fuel cell is compressed during the drying of the sealing material.

8. The method according to claim 1, wherein the bipolar plate has at least one embossed section, and the sealing material is injected only in a region of the embossed section.

9. The method according to claim 2, wherein a barrier layer is applied to at least part of a side face of at least one reaction fluid sealing region of a gas diffusion layer and/or to at least part of a side face of a coolant sealing region of a coolant duct, wherein the barrier layer prevents penetration of sealing material into the gas diffusion layer and/or into the cooling ducts during the injecting.

10. The method according to claim 9, wherein the barrier layer is removed after the injecting of the sealing material.

11. The method according to claim 10, wherein the removing of the sealing material is carried out during operation of the fuel cell.

12. The method according to claim 1, wherein a spacer is fitted between the bipolar plate and the membrane electrode arrangement during injecting of the sealing material.

13. The method according to claim 1, wherein the reaction fluid sealing region of the gas diffusion layer is supported during the injecting of the sealing material in that a side face of the gas diffusion layer protrudes to a same extent as the membrane electrode arrangement.

14. The method according to claim 1, wherein the produced fuel cell is combined with additional fuel cells to form a fuel cell stack of a fuel cell system.

15. The method according to claim 1, wherein the sealing material completely covers the at least one reaction fluid sealing region.

16. The method according to claim 1, wherein the sealing material completely covers the other two sides to be sealed off.

17. The method according to claim 1, wherein the at least one reaction fluid supply region and the at least one reaction fluid discharge region are not sealed off.

* * * * *